(12) United States Patent
Abotabl et al.

(10) Patent No.: US 12,733,032 B2
(45) **Date of Patent: *Sep. 8, 2026**

(54) SYSTEM AND METHOD FOR PERFORMING TRANSMISSION CANCELLATION INDICATION MONITORING

(71) Applicant: Samsung Electronics Co., Ltd., Suwon-si (KR)

(72) Inventors: Ahmed A. Abotabl, San Diego, CA (US); Jung Hyun Bae, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 45 days.

This patent is subject to a terminal disclaimer.

(21) Appl. No.: 18/629,914

(22) Filed: Apr. 8, 2024

(65) Prior Publication Data

US 2024/0260083 A1 Aug. 1, 2024

Related U.S. Application Data

(63) Continuation of application No. 17/827,653, filed on May 27, 2022, now Pat. No. 11,956,819, which is a (Continued)

(51) Int. Cl.
*H04W 74/0808* (2024.01)
*H04W 24/08* (2009.01)
*H04W 72/23* (2023.01)

(52) U.S. Cl.
CPC ....... *H04W 74/0808* (2013.01); *H04W 24/08* (2013.01); *H04W 72/23* (2023.01)

(58) Field of Classification Search
None
See application file for complete search history.

(56) References Cited

U.S. PATENT DOCUMENTS 10,568,114 B2 2/2020 Tseng
11,350,453 B2 * 5/2022 Abotabl ................ H04W 72/23
11,956,819 B2 * 4/2024 Abotabl ................ H04W 72/23
2018/0167848 A1 6/2018 Lei et al.
2018/0255492 A1 * 9/2018 Zhang ............... H04W 36/0011
2018/0324816 A1 * 11/2018 Islam .................. H04W 72/542
(Continued)

FOREIGN PATENT DOCUMENTS

GB 2572453 A 10/2019
WO 2020033660 A1 2/2020
WO 2020068898 A1 4/2020

OTHER PUBLICATIONS

Advisory Action for U.S. Appl. No. 17/827,653, mailed Jul. 10, 2023.

(Continued)

*Primary Examiner* — Clemence S Han
(74) *Attorney, Agent, or Firm* — Renaissance IP Law Group LLP

(57) ABSTRACT

Various aspects include a method of providing, by a network to a UE device, a transmission grant. The method includes initiating a process to provide the transmission grant for a transmission within a particular time. The method includes verifying that there is no cancellation indication that overlaps the particular time. The method includes providing, based on the verification, the transmission grant to the UE device. The method includes determining whether there is no transmission that overlaps with a cancellation window associated with a monitoring occasion, and based on the determination, skipping the monitoring occasion. Also disclosed a system for providing a transmission grant to the UE device.

20 Claims, 13 Drawing Sheets

Related U.S. Application Data continuation of application No. 16/878,601, filed on May 19, 2020, now Pat. No. 11,350,453.

(60) Provisional application No. 62/875,789, filed on Jul. 18, 2019.

(56) References Cited

U.S. PATENT DOCUMENTS

| | | | | |
|---|---|---|---|---|
| 2019/0029009 | A1* | 1/2019 | Freda | H04L 5/0092 |
| 2019/0052432 | A1* | 2/2019 | Islam | H04L 5/0053 |
| 2019/0098612 | A1* | 3/2019 | Babaei | H04W 72/0446 |
| 2019/0320491 | A1 | 10/2019 | Shukair et al. | |
| 2019/0327755 | A1 | 10/2019 | Xiong et al. | |
| 2019/0342911 | A1 | 11/2019 | Talarico et al. | |
| 2020/0052856 | A1 | 2/2020 | Jeon et al. | |
| 2020/0100226 | A1* | 3/2020 | Hosseini | H04W 72/23 |
| 2020/0260391 | A1* | 8/2020 | Zhou | H04W 52/281 |
| 2020/0266932 | A1* | 8/2020 | Yang | H04W 72/23 |
| 2020/0267713 | A1* | 8/2020 | Bagheri | H04L 5/0044 |
| 2020/0344747 | A1* | 10/2020 | Park | H04W 72/21 |
| 2020/0351897 | A1* | 11/2020 | Fakoorian | H04L 5/0096 |
| 2020/0351930 | A1* | 11/2020 | Luo | H04L 1/1819 |
| 2021/0168783 | A1* | 6/2021 | Islam | H04L 5/0053 |

OTHER PUBLICATIONS

CATT, "Discussion on inter-UE UL multiplexing," 3GPP TSG RAN WG1 #97, R1-1906331, 7.2.6.5., Discussion and Decision, May 2019, 7 pages.

European Extended Search Report for Application No. 20178892.4, mailed Mar. 19, 2021.

European Partial Search Report for Application No. 20178892.4, mailed Nov. 30, 2020.

Final Office Action for U.S. Appl. No. 17/827,653, mailed Apr. 13, 2023.

Notice of Allowance for U.S. Appl. No. 17/827,653, mailed Nov. 29, 2023.

Notice of Allowance U.S. Appl. No. 16/878,601, mailed Feb. 2, 2022.

Office Action for U.S. Appl. No. 16/878,601, mailed Aug. 31, 2021.

Office Action for U.S. Appl. No. 17/827,653, mailed Nov. 28, 2022.

Panasonic, "On NR URLLC UL inter UE Tx prioritization/multiplexing," 3GPP TSG RAN WG1 #96, R1-1902521, 7.2.6.2., Discussion, Mar. 2019, 8 pages.

Qualcomm Incorporated, "Uplink inter-UE Tx Multiplexing and Prioritization," 3GPP TSG-RAN WG1 #97, R1-1907285, 7.2.6.5., Discussion/Decision, May 2019, 8 pages.

Vivo, "UL inter-UE Tx prioritization for URLLC", 3GPP TSG RAN WG1 #97, R1-1906150, 7.2.6.5, Discussion and Decision, May 2019, 14 pages.

Vivo: "UL inter-UE Tx prioritization for URLLC", 3GPP Draft; R1-1904085, 3rd Generation Partnership Project (3GPP), Mobile Competence Centre; 650, Route Des Lucioles ; F-06921 Sophia-Antipolis Cedex France, vol. RAN WG1, XP0517071 08, Apr. 12, 2019 (Apr. 12, 2019), 12 pages.

3GPP, "3rd Generation Partnership Project; Technical Specification Group Radio Access Network; NR; Physical layer procedures for control (Release 15)", 3GPP TS 38.213, V1.3.0, Dec. 2017, 58 pages.

* cited by examiner

SYSTEM AND METHOD FOR PERFORMING TRANSMISSION CANCELLATION INDICATION MONITORING

RELATED APPLICATION DATA

This application is a continuation of U.S. patent application Ser. No. 17/827,653, filed on May 27, 2022, now allowed, which is a continuation of U.S. patent application Ser. No. 16/878,601, filed on May 19, 2020, now U.S. Pat. No. 11,350,453, issued May 31, 2022, which claims the benefit of U.S. Provisional Patent Application Ser. No. 62/875,789, filed on Jul. 18, 2019, which are hereby incorporated by reference.

TECHNICAL AREA

The present embodiments relate to wireless network systems, and more particularly, to systems and methods for performing transmission cancellation indication monitoring associated with a user equipment (UE) and a network.

BACKGROUND

Cancellation indication (CI) is an indication from a network to a UE to cancel a UE transmission including time and frequency resources that the network has previously allocated for the UE. The reason behind such a cancellation is to free up some resources for other users that have higher priority information to transmit, e.g., for ultra-reliable and low-latency communication (URLLC).

To perform this cancellation, the UE first needs to receive a CI, which may be delivered via a physical downlink control channel (PDCCH). To receive via the PDCCH, the UE may monitor potential PDCCH transmissions at each monitoring occasion (MO). Existing PDCCH monitoring techniques in New Radio (NR) do not consider the relationship between dynamic grant and cancellation indication. Since a cancellation operation is performed to accommodate a higher priority transmission having an urgent need for transmission, an MO of a CI naturally tends to become quite frequent, and a procedure of CI monitoring can become burdensome for the UE and/or the network.

BRIEF SUMMARY

Various embodiments of the disclosure include a method of providing, by a network to a UE device, a transmission grant. The method may include initiating a process to provide the transmission grant for a transmission within a particular time. The method may include verifying that there is no cancellation indication that overlaps the particular time. The method may include providing, based on a verification that there is no cancellation indication that overlaps, the transmission grant to the UE device.

Some embodiments include a method for reducing processing burden within a UE device. The method may include determining, by a cancellation indication monitoring logic section of the UE device, whether there is no transmission that overlaps with a cancellation window associated with a monitoring occasion. The method may include, based on determining that there is no transmission that overlaps with the cancellation window, skipping the monitoring occasion.

Some embodiments include a system, comprising a UE device and a remote server. The remote server can be configured to provide a transmission grant for a transmission within a particular time. The remote server can be further configured to verify that there is no cancellation indication that overlaps the particular time. The remote server can further be configured to provide, based on a verification that there is no cancellation indication that overlaps, the transmission grant to the UE device.

Some embodiments include a cancellation monitoring logic section of a UE device. The cancellation monitoring logic section can be configured to determine whether there is no transmission that overlaps with a cancellation window associated with a monitoring occasion. The cancellation monitoring logic section can be configured to, based on determining that there is no transmission that overlaps with the cancellation window, skip the monitoring occasion.

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Figure 1:
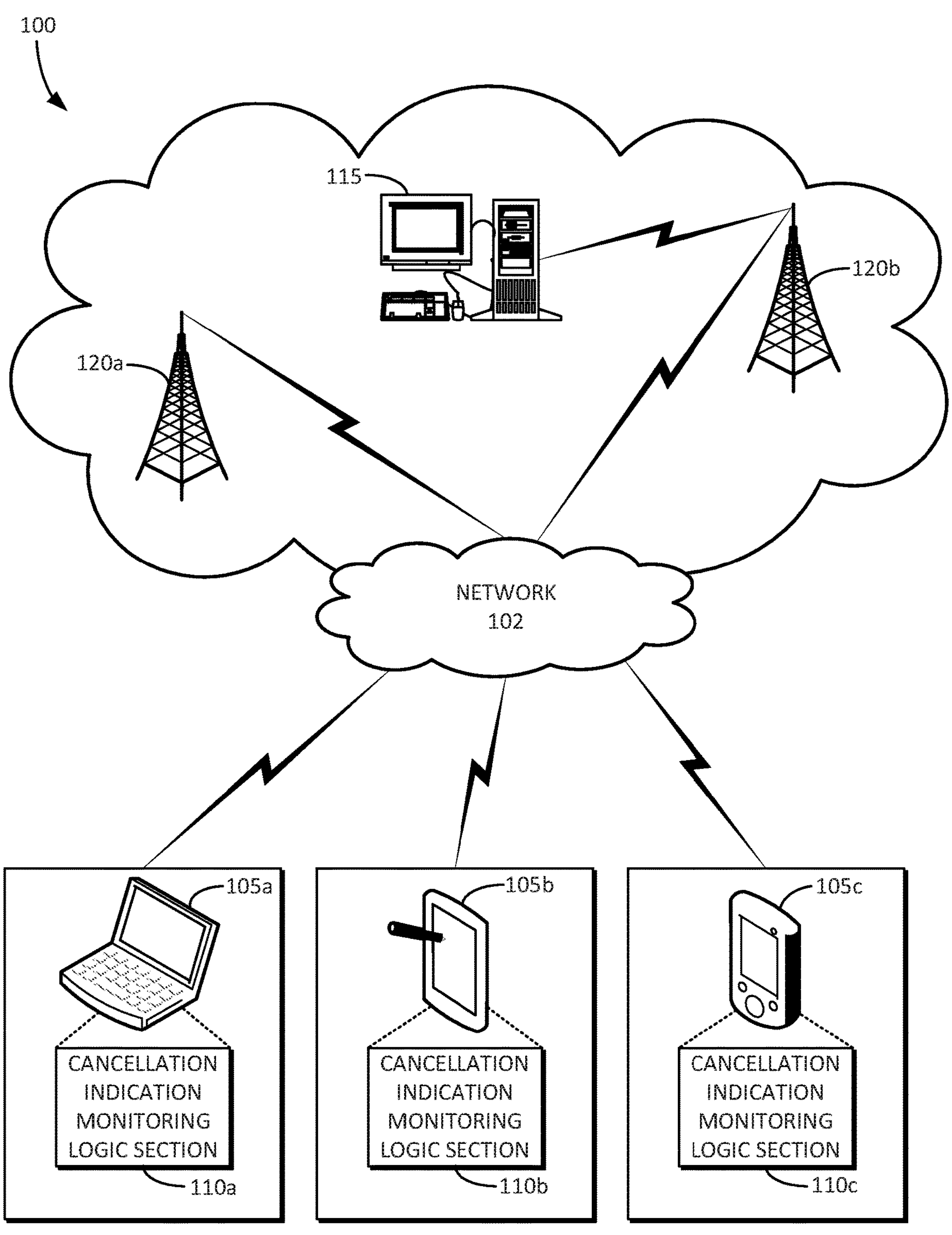
FIG. 1 illustrates a system including a network and one or more UE devices each having a cancellation indication monitoring logic section in accordance with some embodiments disclosed herein.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first interface could be termed a second interface, and, similarly, a second interface could be termed a first interface, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein provide a CI monitoring method and system in which a UE can reduce processing burden. Based on the CI monitoring configuration and the corresponding scheduling described herein, certain MOs can be skipped, which can reduce a UE's processing burden.

A CI is an indication from a network to a UE to cancel the UE's transmission including time and frequency resources that the network has previously allocated for the UE. To perform this cancellation, the UE may first receive the CI, which may be delivered via the PDCCH. To receive via the PDCCH, the UE may monitor potential PDCCH transmissions at each MO.

Since a cancellation operation is performed to accommodate higher priority transmissions having an urgent need for transmission, an MO of a CI naturally tends to become quite frequent and burdensome. Accordingly, some embodiments disclosed herein include a system and method for performing CI monitoring in which the UE can reduce such processing burden. For example, the system and method can ensure that the UE does not receive a grant for a transmission whose starting point in time is the same as or later than a starting point in time of the corresponding CI. The starting point in time of the CI may match the starting point in time of the MO, and the ending point in time of the CI may match the ending point in time of the MO. Thus the CI and MO timing windows may overlap in some or most cases.

FIG. 1 illustrates a system 100 including a network 102 and one or more UE devices (e.g., 105*a*, 105*b*, 105*c*) each having a cancellation indication monitoring logic section (e.g., 110*a*, 110*b*, 110*c*) in accordance with some embodiments disclosed herein. The network 102 may include a cellular network or other type of wireless network. The UE devices may include, for example, a mobile computer 105*a*, a smart tablet 105*b*, a smart mobile phone 105*c*, or the like. The one or more UE devices (e.g., 105*a*, 105*b*, 105*c*) may be communicatively coupled to one or more remote servers (e.g., 115) via the network 102. The network 102 may include one or more towers such as cell towers 120*a* and 120*b* to facilitate transmission of information between the one or more UE devices (e.g., 105*a*, 105*b*, 105*c*) and the network 102. The network 102 may include the one or more remote servers 115. The cancellation indication monitoring logic section (e.g., 110*a*, 110*b*, 110*c*) may be embedded within each of the corresponding UE devices (e.g., 105*a*, 105*b*, 105*c*). The cancellation indication monitoring logic section (e.g., 110*a*, 110*b*, 110*c*) may be embodied as software, firmware, hardware, or any suitable combination thereof.

Figure 2:
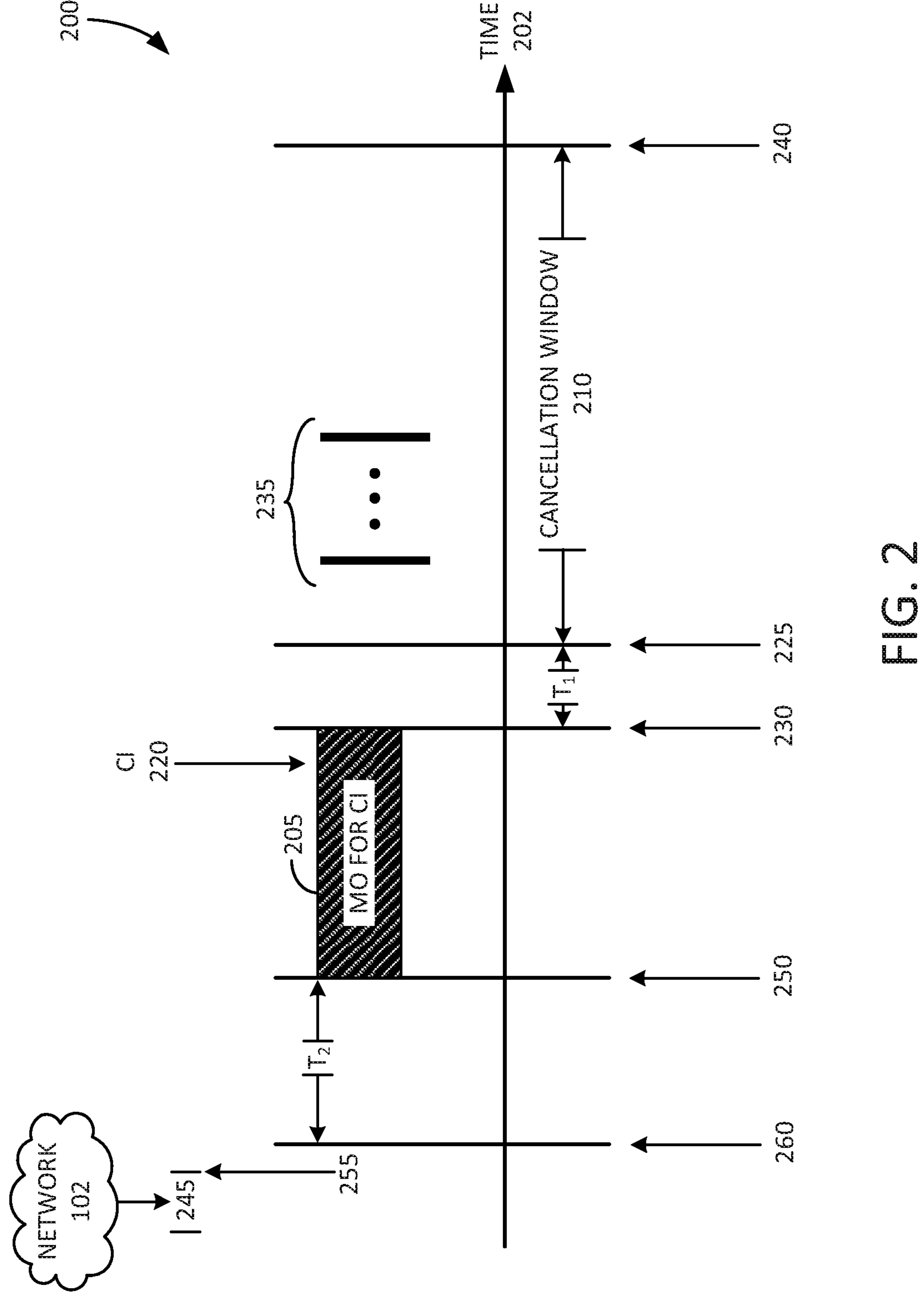
FIG. 2 illustrates a timing diagram along a time axis including an MO for a CI, a cancellation window, and other time periods related to a cancellation monitoring operation in accordance with some embodiments disclosed herein.

FIG. 2 illustrates a timing diagram 200 along a time axis 202 including an MO 205 for a CI (e.g., 220), a cancellation window 210, and other time periods (e.g., $T_1$ and $T_2$) related to a cancellation monitoring operation in accordance with some embodiments disclosed herein.

Given a particular MO 205 for a CI (e.g., 220), the cancellation window 210 of a potential cancellation region may be determined, which is associated with the particular MO 205. In other words, based on a CI (e.g., 220) detected within the MO 205, one or more scheduled transmissions 235 that would otherwise occur within the cancellation window 210 may be cancelled. A starting point in time of the cancellation window 210 may be at 225, which may be a distance of $T_1$ from an ending point 230 of the MO 205, as shown in FIG. 1. The time period $T_1$ can be determined based on a processing time of the CI 220, which can include a decoding time of the CI 220, and/or preparation time of a cancellation operation of the one or more scheduled transmissions 235.

$T_1$ may define an earliest possible point in time at which the one or more cancellation indication monitoring logic sections (e.g., 110*a*, 110*b*, 110*c*) of the one or more UE devices (e.g., 105*a*, 105*b*, and 105*c* of FIG. 1) can perform a cancellation operation in response to the CI 220 detected during the MO 205. An ending point 240 in time of the cancellation window 210 may be based on how far ahead a cancellation can be indicated, and this may be dependent on the design of the cancellation indication signaling. In some embodiments, a length of the cancellation window 210 may be based on a length of the MO 205. In some embodiments, the length of the cancellation window 210 is at least as long as the length of the MO 205.

In some embodiments, the cancellation window 210 may begin at an ending point 225 of $T_1$ from the ending point 230 of the MO 205. The one or more scheduled transmissions 235 associated with the one or more UE devices (e.g., 105*a*, 105*b*, and 105*c* of FIG. 1) that fall within the cancellation window 210 may be cancelled based on the CI 220 detected during the corresponding MO 205. $T_1$ may be the time needed to process a cancellation operation based on the CI 220 detected during the MO 205, which can include decoding time of the CI 220 and preparation time of the cancellation operation. In some embodiments, $T_1$ is a variable time value that may be dependent on one or more characteristics of the CI 220.

In some embodiments, the ending point 240 of the cancellation window 210 may depend on a period "P" (e.g., a gap) of the MO 205. One possible value of a length of the cancellation window 210 may be equal to "P."

In some embodiments, the disclosed cancellation system and method can ensure that the network 102 does not provide a dynamic transmission grant (e.g., 245) at the same time as, or after, the network 102 determines to send a CI (e.g., 220). Accordingly, the one or more UE devices (e.g., 105*a*, 105*b*, and 105*c* of FIG. 1) need not receive a dynamic transmission grant (e.g., 245) for a transmission falling within the cancellation window 210 after the MO 205 starts.

In some embodiments, the cancellation system and method disclosed herein ensures that an ending point 255 of a dynamic transmission grant (e.g., 245), i.e., a last possible time of reception by the one or more UE devices (e.g., 105*a*, 105*b*, and 105*c* of FIG. 1) of the dynamic transmission grant 245, is at least $T_2$ before a starting point 250 of the MO 205. $T_2$ may be a decoding time of uplink (UL) grant or downlink (DL) grant scheduling acknowledgment (ACK) and/or negative acknowledgment (NACK) associated with a physical uplink control channel (PUCCH). In other words, the one or more cancellation indication monitoring logic sections (e.g., 110*a*, 110*b*, 110*c*) of the one or more UE devices (e.g., 105*a*, 105*b*, and 105*c* of FIG. 1) need not expect to receive a transmission grant (e.g., 245) whose ending point (e.g., 255) is later than point 260 in time (i.e., $T_2$ before the starting point 250 of the MO 205) for a transmission (e.g., 235) falling within the cancellation window 210. In some embodiments, no downlink control information (DCI) incurring UL transmission overlapping with the cancellation window 210 is expected after the point 250 in time. In some embodiments, there is no MO for a UL grant within the time period $T_2$.

Figure 3:
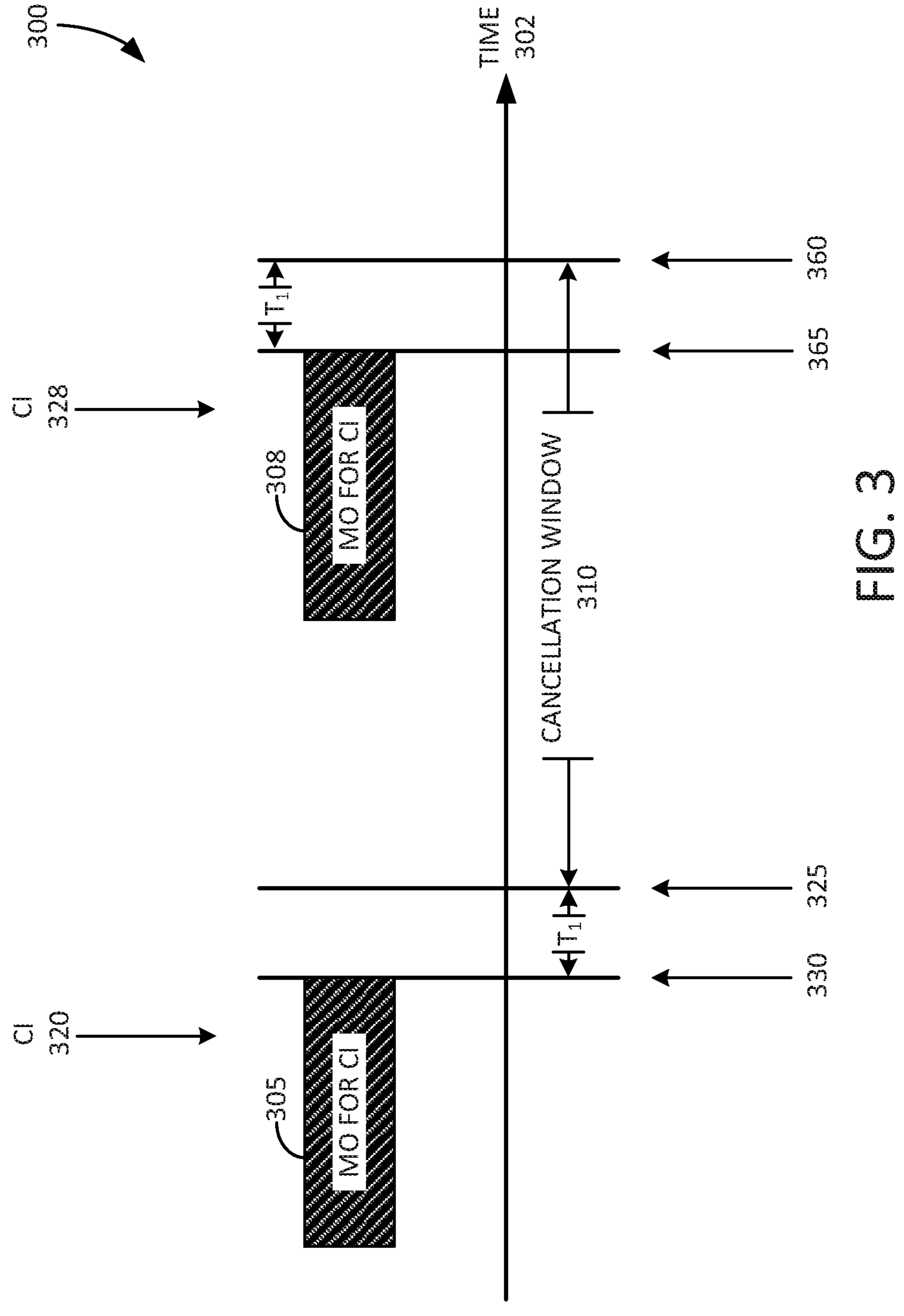
FIG. 3 illustrates a timing diagram along a time axis including an MO for a CI, a cancellation window, and other time periods related to a cancellation monitoring operation in accordance with some embodiments disclosed herein.

FIG. 3 illustrates a timing diagram 300 along a time axis 302 including an MO 305 for a CI (e.g., 320), an MO 308 for a CI (e.g., 328), a cancellation window 310, and other time periods (e.g., $T_1$) related to a cancellation monitoring operation in accordance with some embodiments disclosed herein.

One possible candidate of a length of a cancellation window 310 starts at an ending point 325 of $T_1$ after an ending point 330 of the MO 305 for the CI (e.g., 320), and ends at an ending point 360 of $T_1$ after an ending point 365 of a next MO 308 for the CI (e.g., 328) as shown in FIG. 2. In some embodiments, a length of the cancellation window 310 may depend on a period "P" (e.g., a gap) of the MO 308. One possible value of a length of the cancellation window 210 may be equal to "P."

In addition, processing burden of the one or more UE devices (e.g., 105*a*, 105*b*, and 105*c* of FIG. 1) for monitoring for the CI (e.g., 320, 328) may be reduced based on there being no UL transmission (e.g., 235 of FIG. 2) scheduled that is overlapping with the corresponding cancellation window 310. The one or more cancellation indication monitoring logic sections (e.g., 110*a*, 110*b*, 110*c*) of the one or more UE devices (e.g., 105*a*, 105*b*, and 105*c* of FIG. 1) can determine the existence of a semi-static transmission state. Accordingly, the one or more cancellation indication monitoring logic sections (e.g., 110*a*, 110*b*, 110*c*) of the one or more UE devices (e.g., 105*a*, 105*b*, and 105*c* of FIG. 1) can control their scheduling request (SR) transmission. Hence, the one or more cancellation indication monitoring logic sections (e.g., 110*a*, 110*b*, 110*c*) of the one or more UE devices (e.g., 105*a*, 105*b*, and 105*c* of FIG. 1) can skip the MO (e.g., 305, 308) for the CI (e.g., 320, 328) based on the determination that there is no transmission potentially overlapping with the cancellation window 310 associated with the corresponding MO (e.g., 305, 308). Thus, the one or more cancellation indication monitoring logic sections (e.g., 110*a*, 110*b*, 110*c*) of the one or more UE devices (e.g., 105*a*, 105*b*, and 105*c* of FIG. 1) can determine that there is no scheduled transmission (e.g., 235 of FIG. 2) that overlaps the cancellation window 310, and actively skip the corresponding MO 308. In other words, the one or more UE devices (e.g., 105*a*, 105*b*, and 105*c* of FIG. 1) need not expend any processing cycles doing any monitoring for the CI 328 during the MO 308.

Figure 4:
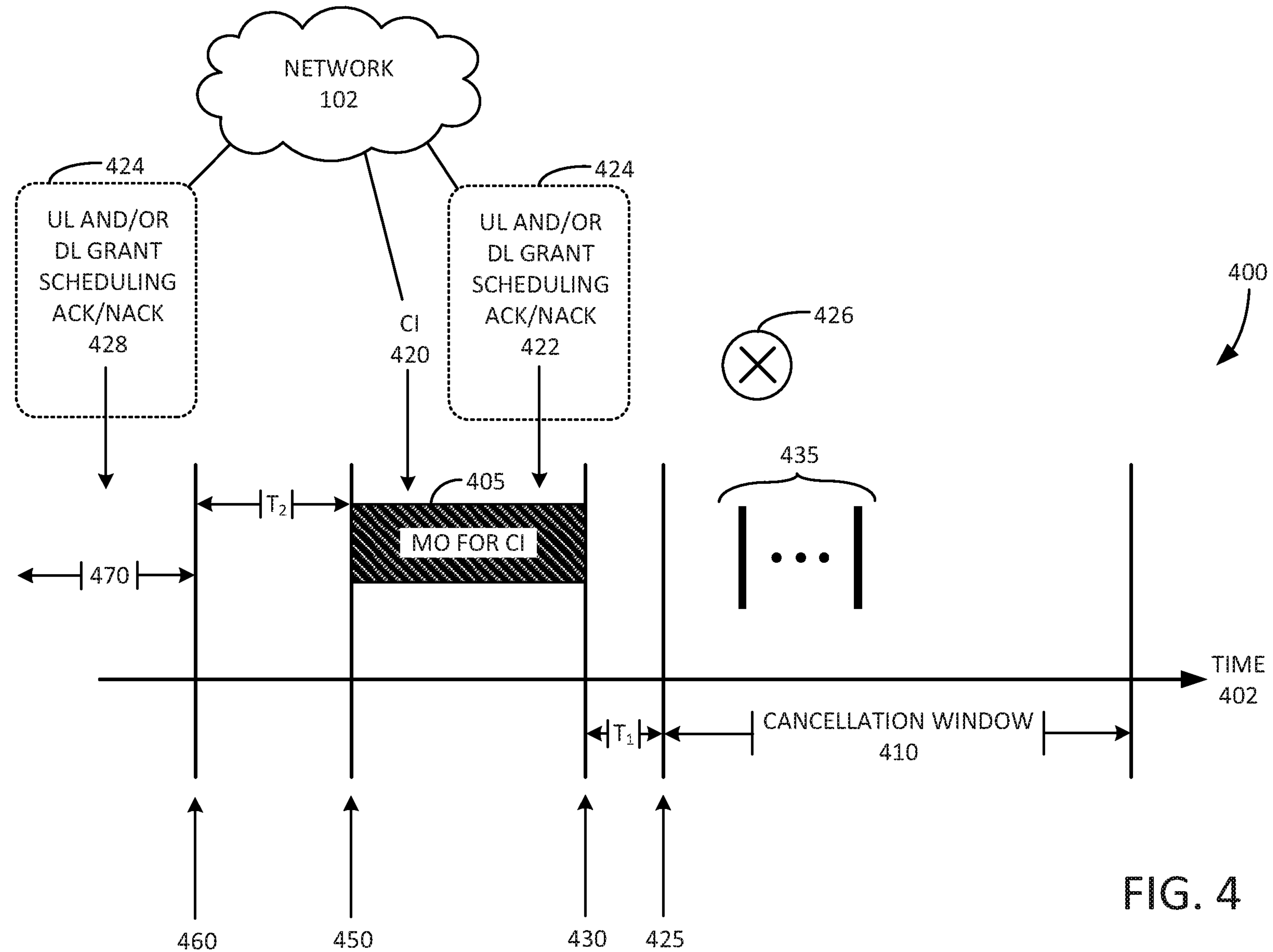
FIG. 4 illustrates a timing diagram along a time axis including an MO for a CI, a cancellation window, and other time periods related to a cancellation monitoring operation in accordance with some embodiments disclosed herein.

FIG. 4 illustrates a timing diagram 400 along a time axis 402 including an MO 405 for a CI (e.g., 420), a cancellation window 410, and other time periods (e.g., $T_1$ and $T_2$) related to a cancellation monitoring operation in accordance with some embodiments disclosed herein.

In some embodiments, one or more dynamic transmissions 435, which are within the cancellation window 410 can be scheduled before and/or after the MO 405 of the CI (e.g., 420). For example, a UL grant and/or a DL grant scheduling ACK/NACK 422 via a PUCCH 424 may be provided after a starting point 450 of the MO 405 of the CI (e.g., 420). In some embodiments, the network 102 is at least informed of a cancellation 426 that overlaps with the one or more dynamic transmissions 435.

Since such a transmission (i.e., a dynamic transmission 435 that overlaps with the cancellation 426) will anyway be cancelled, the network 102 need not provide the corresponding UL and/or DL grant 422. In some embodiments, the dynamic UL and/or DL grant 422 is not provided by the network 102 after the CI 420 of the corresponding transmission (e.g., 435) is provided. Put differently, the network 102 need not grant a transmission when the network 102 possesses information that there is a CI 420 for that transmission. A starting point of a dynamic grant (e.g., 422) should not be the same or later than a starting point of the CI 420. In other words, the one or more cancellation indication monitoring logic sections (e.g., 110*a*, 110*b*, 110*c*) of the one or more UE devices (e.g., 105*a*, 105*b*, and 105*c* of FIG. 1) need not expect to receive a grant whose starting point is the same or later than the starting point of the CI 420 when the corresponding transmission (e.g., 435) is cancelled (e.g., at 426) by the CI 420. Put differently, the one or more cancellation indication monitoring logic sections (e.g., 110*a*, 110*b*, 110*c*) of the one or more UE devices (e.g., 105*a*, 105*b*, and 105*c* of FIG. 1) can infer that a transmission grant will not be received whose starting point is the same or later than the starting point of the CI 420 when the corresponding transmission (e.g., 435) is cancelled (e.g., at 426) by the CI 420. Based on the inference, the one or more cancellation indication monitoring logic sections (e.g., 110*a*, 110*b*, 110*c*) of the one or more UE devices (e.g., 105*a*, 105*b*, and 105*c* of FIG. 1) can cause a monitoring occasion to be skipped.

In a case where a UL grant (e.g., 422) arrives considerably later than the CI 420, then the one or more cancellation indication monitoring logic sections (e.g., 110*a*, 110*b*, 110*c*) of the one or more UE devices (e.g., 105*a*, 105*b*, and 105*c* of FIG. 1) may have already decoded the CI 420 and recognized or otherwise determined the cancellation 426 before decoding the UL grant (e.g., 422). In this case, the one or more UE devices (e.g., 105*a*, 105*b*, and 105*c* of FIG. 1) may receive the UL grant (e.g., 422) corresponding to one or more already-cancelled orthogonal frequency-division multiplexing (OFDM) symbols. Hence, when the starting point of the dynamic grant (e.g., 422) is not the same or later than the starting point of the CI 420, then the one or more UE devices (e.g., 105*a*, 105*b*, and 105*c* of FIG. 1) need not expect to be scheduled to transmit in the cancelled symbols indicated by the CI 420. Put differently, when the starting point of the dynamic grant (e.g., 422) is not the same or later than the starting point of the CI 420, then the one or more UE devices (e.g., 105*a*, 105*b*, and 105*c* of FIG. 1) can infer that the cancelled symbols indicated by the CI 420 will not be scheduled to transmit. Based on the inference, the one or more cancellation indication monitoring logic sections (e.g., 110*a*, 110*b*, 110*c*) of the one or more UE devices (e.g., 105*a*, 105*b*, and 105*c* of FIG. 1) can cause a monitoring occasion to be skipped.

In some embodiments, the one or more UE devices (e.g., 105*a*, 105*b*, and 105*c* of FIG. 1) do not expect to receive (e.g., the UE devices can make an inference that they will not receive) a PDCCH carrying UL grant (e.g., 245, 422, 428) including an ending symbol no earlier than a last symbol of a PDCCH carrying DCI with the CI 420 when the corresponding transmission (e.g., 435) is in resource colliding (e.g., at 426) with ones indicated by the DCI with the CI 420. In some embodiments, when an ending symbol of the PDCCH carrying the UL grant (e.g., 245, 422, 428) is earlier than the last symbol of the PDCCH carrying DCI with the CI 420, the DCI with the CI 420 is applicable to the UL grant (e.g., 245, 422, 428) scheduling transmission (e.g., 435).

In some embodiments, the one or more UE devices (e.g., 105*a*, 105*b*, and 105*c* of FIG. 1) do not expect to receive (e.g., the UE devices can make an inference that they will not receive) a PDCCH carrying UL grant (e.g., 245, 422, 428) including an ending symbol no earlier than a first symbol of a PDCCH carrying DCI with the CI 420 when the corresponding transmission (e.g., 435) is in resource colliding (e.g., at 426) with ones indicated by the DCI with the CI 420. In some embodiments, when an ending symbol of the PDCCH carrying the UL grant (e.g., 245, 422, 428) is earlier than the first symbol of the PDCCH carrying DCI with the CI 420, the DCI with the CI 420 is applicable to the UL grant (e.g., 245, 422, 428) scheduling transmission (e.g., 435).

Consider the case where a UL and/or DL grant scheduling ACK/NACK 428 via the PUCCH 424 is provided before the MO 405 of the CI 420. In this case, the one or more UE devices (e.g., 105*a*, 105*b*, and 105*c* of FIG. 1) can know of the existence of UL grant (e.g., 428) as long as the corresponding decoding is finished before the MO 405 of the CI 420. The time for decoding can be equal to $T_2$ as shown in FIG. 4. Accordingly, the one or more UE devices (e.g., 105*a*, 105*b*, and 105*c* of FIG. 1) can skip monitoring the MO 405 of the CI 420 when there is no other PDCCH MO, which can provide a DL and/or a UL grant between a point 460 and the starting point 450 of the MO 405 of the CI 420. In other words, the one or more UE devices (e.g., 105*a*, 105*b*, and 105*c* of FIG. 1) can skip monitoring the MO 405 of the CI 420 when there is no other PDCCH MO, which can provide a DL and/or a UL grant within the $T_2$ time period.

One possible value of $T_2$ can be $N_2$, which may be defined in an NR specification. Hence, in some embodiments, a dynamic grant (e.g., 428) may be provided by the network 102 at least $T_2$ before the CI 420 (i.e., before the starting point 450 of the MO 405) of the corresponding UL transmission (e.g., 435). An ending point of the dynamic grant (e.g., 428) should not be later than $T_2$ before the starting point of the CI 420 (i.e., before the starting point 450 of the MO 405). Put differently, an ending point of the dynamic grant (e.g., 428) should not be later than the point 460 in time. In other words, the one or more UE devices (e.g., 105*a*, 105*b*, and 105*c* of FIG. 1) need not expect to receive a grant whose ending point is later than $T_2$ before the starting point 450 of the MO 405 when the corresponding transmission (e.g., 435) is cancelled by the CI 420.

In some embodiments, the network 102 may provide a transmission grant (e.g., 428) for a transmission (e.g., 435) to the one or more UE devices (e.g., 105*a*, 105*b*, and 105*c* of FIG. 1). The network 102 may initiate a process to provide the transmission grant 428 for a transmission (e.g., 435) within a particular time. The network 102 may verify that there is no CI (e.g., 420) that overlaps with the particular time. Based on the verification that there is no overlap, the network 102 may provide the transmission grant 428 to the one or more UE devices (e.g., 105*a*, 105*b*, 105*c*). In other words, the network 102 may verify that a cancellation 426 indicated by the CI 420 does not overlap with a particular time in which a scheduled transmission 435 is scheduled, and based on that verification, the network 102 may provide the transmission grant 428. Otherwise, the network 102 may not provide the transmission grant 428 so that processing resources may be preserved. The particular time may be the cancellation window 410. Thus, the network 102 may initiate the process to provide the transmission grant 428 for the transmission 435 at a time falling within the cancellation window 410.

In some embodiments, the network 102 may determine a grant window 470 in which the transmission grant 428 for the transmission 435 falling within the cancellation window 410 can be provided to the one or more UE devices (e.g., 105*a*, 105*b*, and 105*c* of FIG. 1). In some embodiments, the network 102 does not provide any grant outside of the grant window. The network 102 may verify that the transmission grant 428 falls within the grant window 470. The network 102 may provide, based on the verification, the transmission grant 428 to the one or more UE devices (e.g., 105*a*, 105*b*, 105*c*).

In some embodiments, the cancellation window 410 is associated with the MO 405, which is associated with the one or more UE devices (e.g., 105*a*, 105*b*, and 105*c* of FIG. 1). The cancellation window 410 may include a starting point 425 at a time $T_1$ following an ending point 430 of the MO 405. The time $T_1$ may be based on a time needed by the one or more UE devices (e.g., 105*a*, 105*b*, 105*c*) to process a cancellation (e.g., 426) of the transmission grant (e.g., 428).

In some embodiments, the grant window 470 includes an ending point 460 at a time $T_2$ before a starting point 450 of the MO 405. The time $T_2$ may be based on a time needed by the one or more UE devices (e.g., 105*a*, 105*b*, 105*c*) for processing the transmission grant 428. The network 102 may receive an indication of the time $T_2$ from the one or more UE devices (e.g., 105*a*, 105*b*, 105*c*). In other words, the one or more UE devices (e.g., 105*a*, 105*b*, 105*c*) may provide the $T_2$ value to the network 102.

Figure 5:
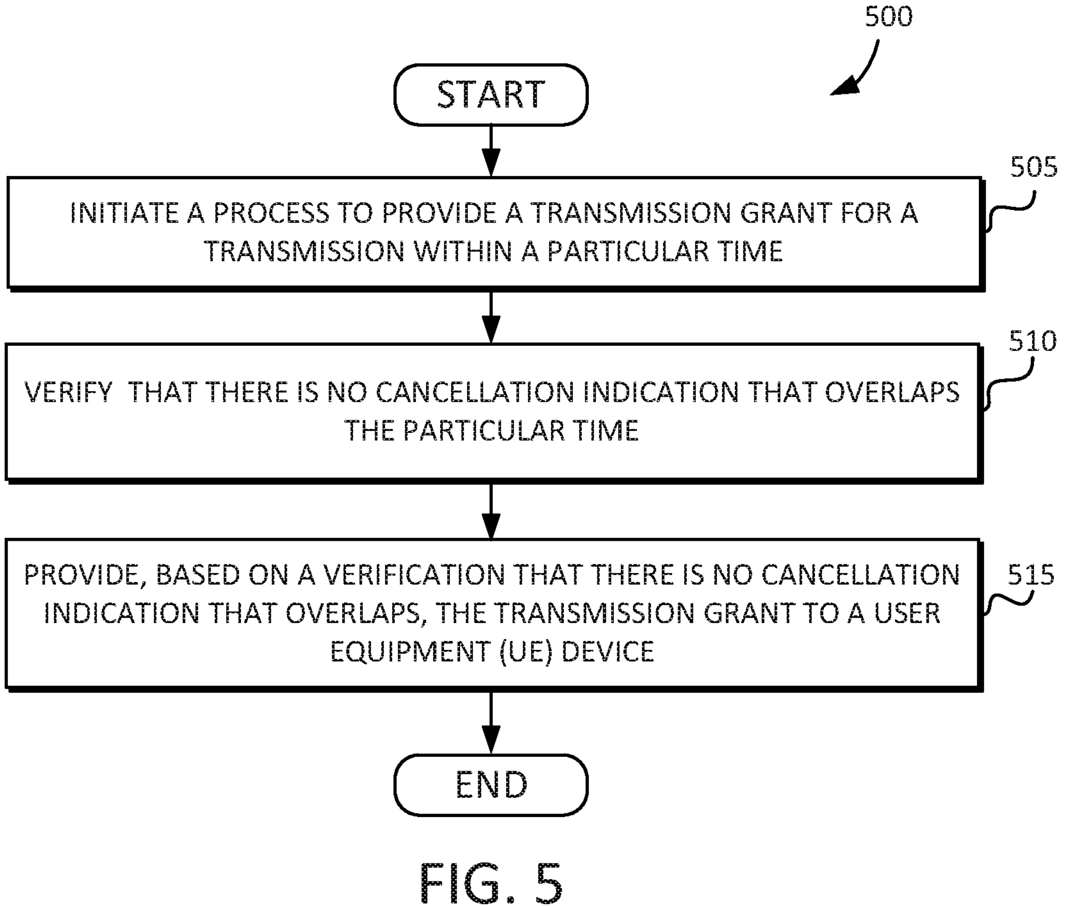
FIG. 5 is a flow diagram illustrating a technique for providing, by a network to a UE device, a transmission grant in accordance with some embodiments disclosed herein.

FIG. 5 is a flow diagram 500 illustrating a technique for providing, by a network (e.g., 102 of FIG. 1) to a UE device (e.g., 105*a*, 105*b*, and 105*c* of FIG. 1), a transmission grant in accordance with some embodiments disclosed herein. At 505, a process is initiated to provide the transmission grant for a transmission within a particular time. At 510, a verification can be performed that there is no cancellation indication that overlaps the particular time. At 515, based on a verification that there is no cancellation indication that overlaps, the network can provide the transmission grant to the UE device.

Figure 6:
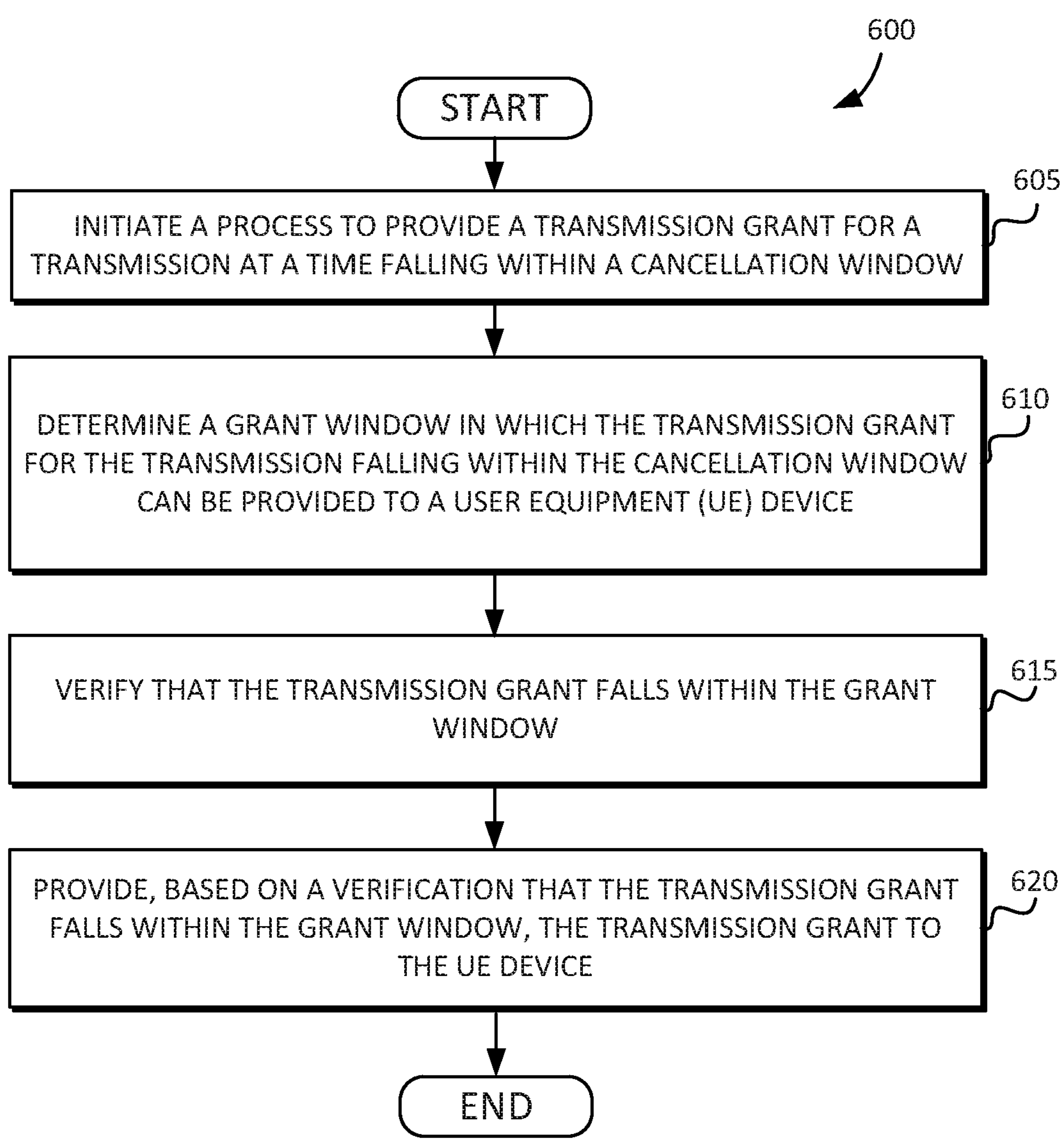
FIG. 6 is a flow diagram illustrating another technique for providing, by a network to a UE device, a transmission grant in accordance with some embodiments disclosed herein.

FIG. 6 is a flow diagram 600 illustrating another technique for providing, by a network (e.g., 102 of FIG. 1) to a UE device (e.g., 105*a*, 105*b*, and 105*c* of FIG. 1), a transmission grant in accordance with some embodiments disclosed herein. At 605, a process may be initiated to provide the transmission grant for a transmission at a time falling within a cancellation window. At 610, a grant window may be determined in which the transmission grant for the transmission falling within the cancellation window can be provided to the UE device. In some embodiments, the network does not provide any transmission grant outside of the grant window. At 615, the transmission grant may be verified to fall within the grant window. At 620, based on a verification that the transmission grant falls within the grant window, the transmission grant may be provided to the UE device.

Figure 7:
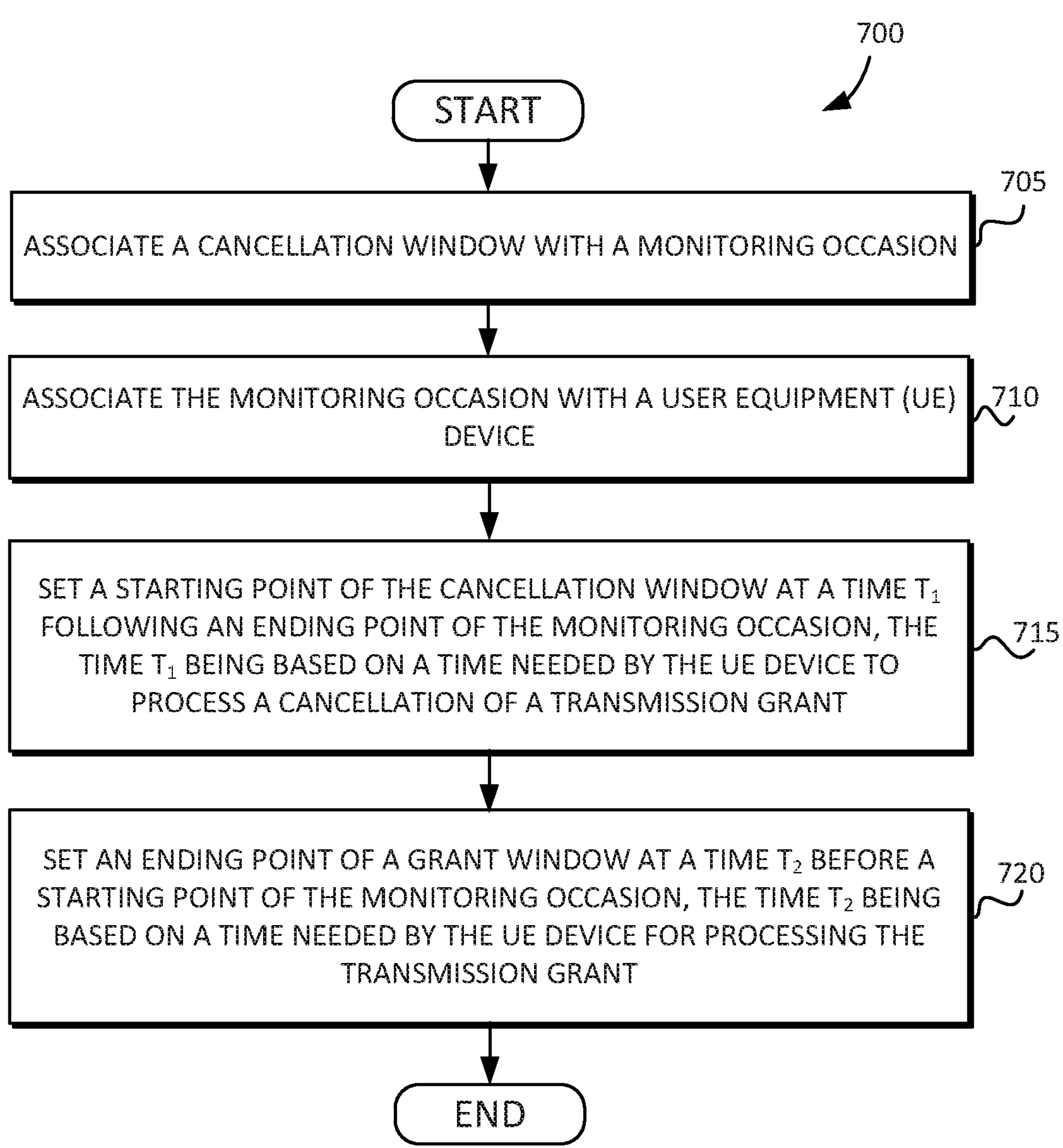
FIG. 7 is a flow diagram illustrating a technique for establishing a cancellation window and a grant window in accordance with some embodiments disclosed herein.

FIG. 7 is a flow diagram 700 illustrating a technique for establishing a cancellation window (e.g., 210, 310, 410) and a grant window (e.g., 470) in accordance with some embodiments disclosed herein. At 705, a cancellation window can be associated with a monitoring occasion. At 710, the monitoring occasion can be associated with a UE device (e.g., 105*a*, 105*b*, 105*c*). At 715, a starting point of the cancellation window can be set at a time $T_1$ following an ending point of the monitoring occasion, the time $T_1$ being based on a time needed by the UE device to process a cancellation of the transmission grant. At 720, an ending point of a grant window can be set at a time $T_2$ before a starting point of the monitoring occasion, the time $T_2$ being based on a time needed by the UE device for processing the transmission grant. The network can receive an indication of the time $T_2$ from the UE device.

Figure 8:
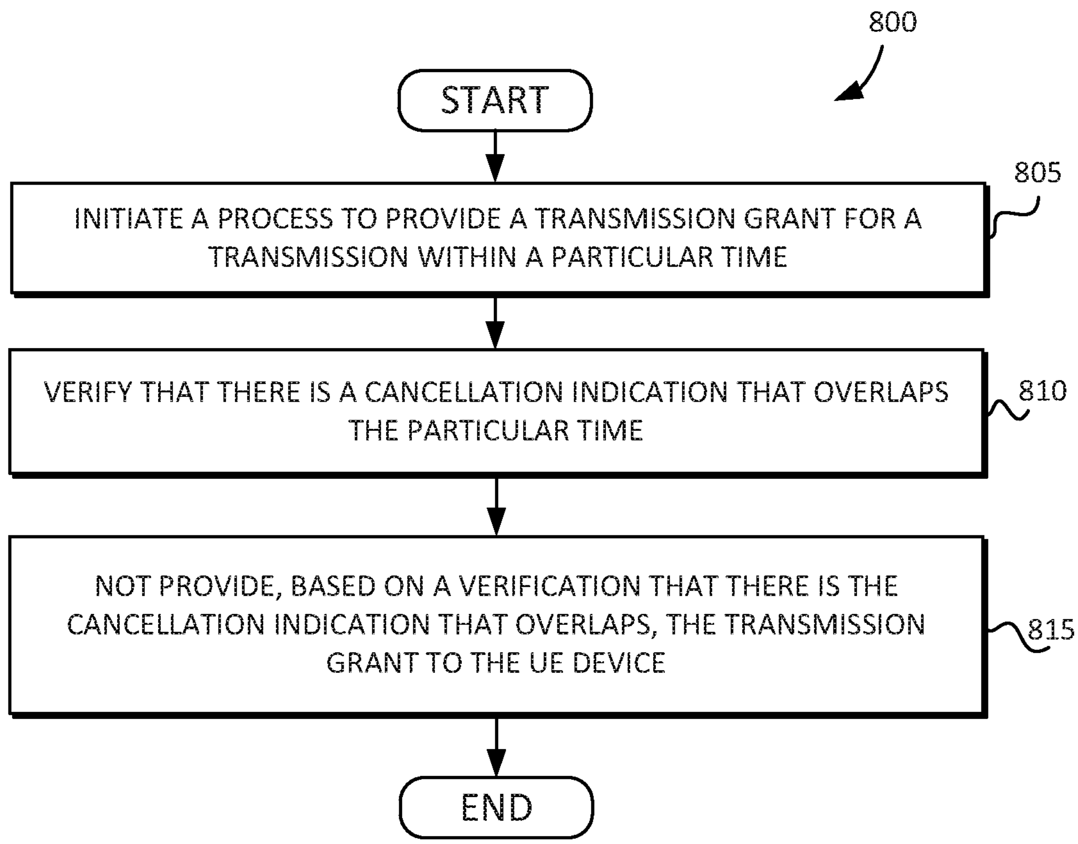
FIG. 8 is a flow diagram illustrating a technique for not providing, by a network to a UE device, a transmission grant in accordance with some embodiments disclosed herein.

FIG. 8 is a flow diagram 800 illustrating a technique for not providing, by a network (e.g., 102) to a UE device (e.g., 105*a*, 105*b*, 105*c*), a transmission grant in accordance with some embodiments disclosed herein. At 805, a process can be initiated to provide a transmission grant for a transmission within a particular time. At 810, a verification can be performed to verify that there is a cancellation indication that overlaps with the particular time. At 815, based on the verification that there is the cancellation indication that overlaps, the transmission grant can be not provided to the UE device.

Figure 9:
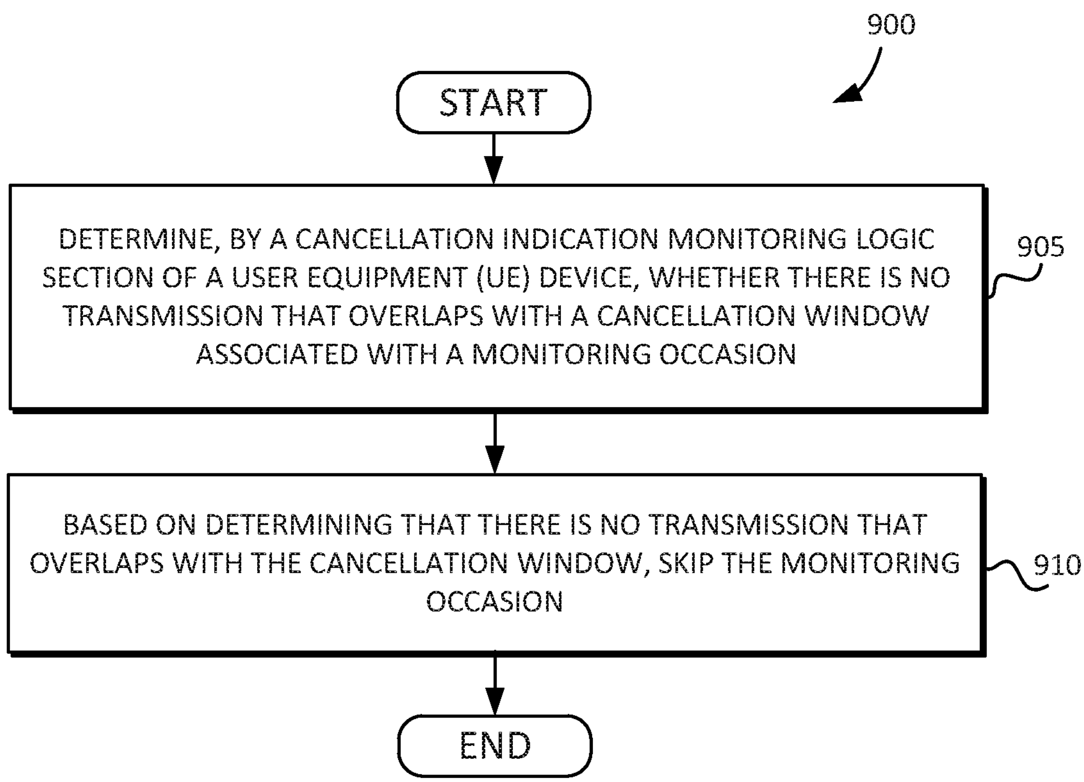
FIG. 9 is a flow diagram illustrating a technique for skipping a monitoring occasion in accordance with some embodiments disclosed herein.

FIG. 9 is a flow diagram 900 illustrating a technique for skipping an MO (e.g., 205, 305, 308, 405) in accordance with some embodiments disclosed herein. At 905, a cancellation indication monitoring logic section of the UE device (e.g., 105*a*, 105*b*, 105*c*) can determine whether there is no transmission that overlaps with a cancellation window associated with a monitoring occasion. At 910, based on determining that there is no transmission that overlaps with the cancellation window, the monitoring occasion can be skipped by the UE device.

Figure 10:
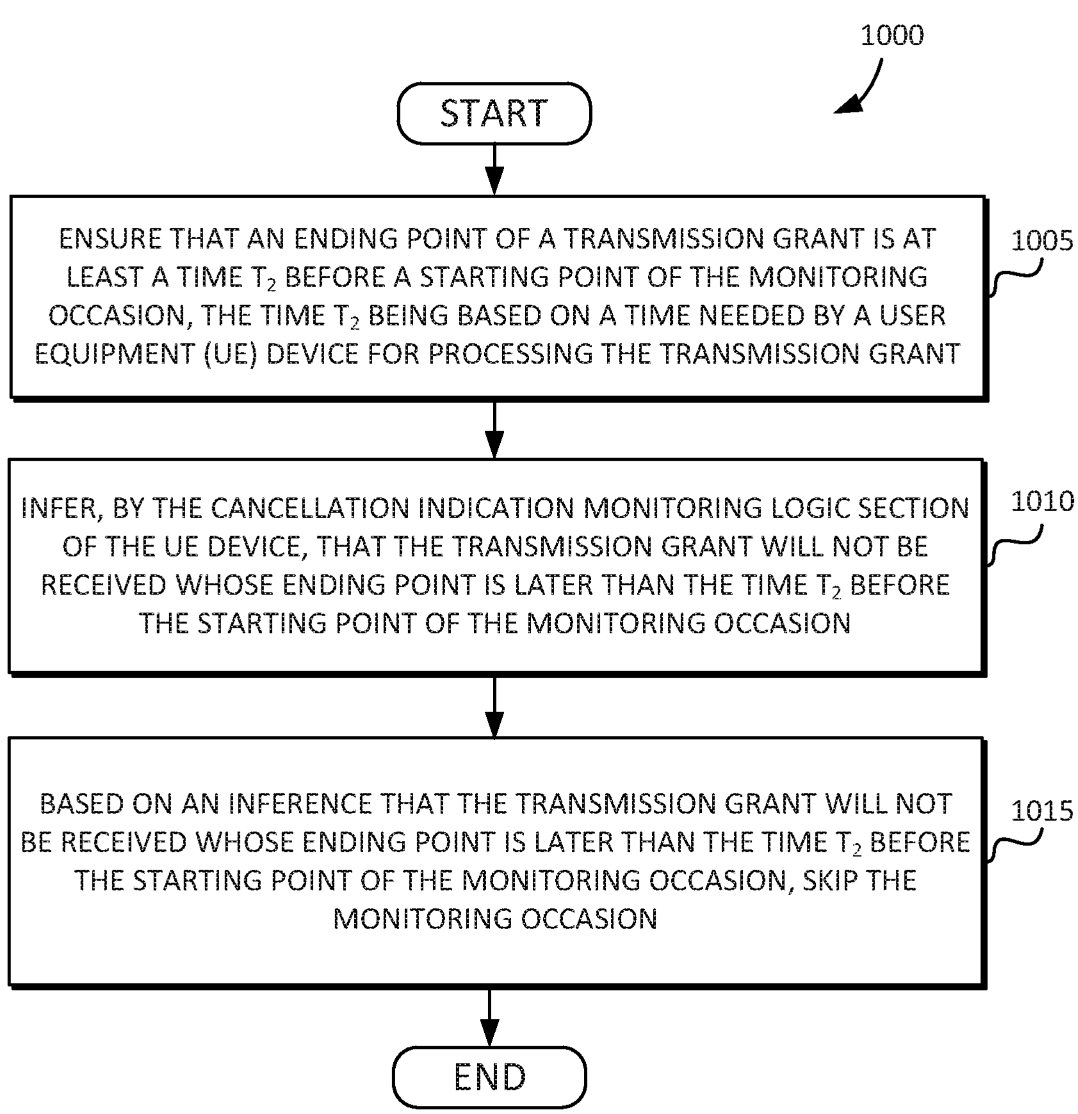
FIG. 10 is a flow diagram illustrating another technique for skipping a monitoring occasion in accordance with some embodiments disclosed herein.

FIG. 10 is a flow diagram 1000 illustrating another technique for skipping an MO (e.g., 205, 305, 308, 405) in accordance with some embodiments disclosed herein. At 1005, a network (e.g., 102) can ensure that an ending point of a transmission grant is at least a time $T_2$ before a starting point of the monitoring occasion, the time $T_2$ being based on a time needed by the UE device for processing the transmission grant. At 1010, a cancellation indication monitoring logic section of the UE device can infer that the transmission grant will not be received whose ending point is later than the time $T_2$ before the starting point of the monitoring occasion. At 1015, based on an inference that the transmission grant will not be received whose ending point is later than the time $T_2$ before the starting point of the monitoring occasion, the monitoring occasion can be skipped.

Figure 11:
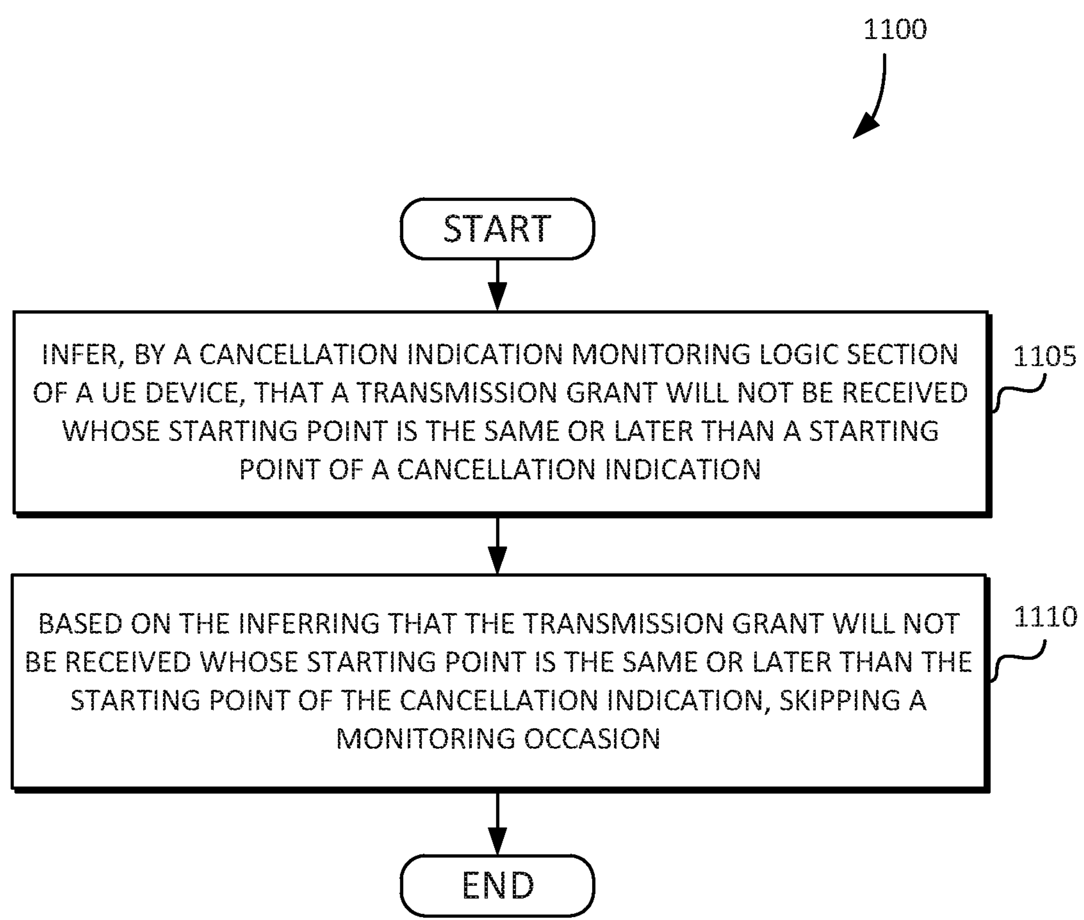
FIG. 11 is a flow diagram illustrating yet another technique for skipping a monitoring occasion in accordance with some embodiments disclosed herein.

FIG. 11 is a flow diagram 1100 illustrating yet another technique for skipping a monitoring occasion (e.g., 205, 305, 308, 405) in accordance with some embodiments disclosed herein. At 1105, a cancellation indication monitoring logic section (e.g., 110*a*, 110*b*, 110*c*) of a UE device (e.g., 105*a*, 105*b*, 105*c*), that a transmission grant (e.g., 245, 422, 428) will not be received whose starting point is the same or later than a starting point of a cancellation indication (e.g., 220, 320, 328, 420). At 1110, based on the inferring that the transmission grant (e.g., 245, 422, 428) will not be received whose starting point is the same or later than the starting point of the cancellation indication (e.g., 220, 320, 328, 420), the cancellation indication monitoring logic section of the UE device may cause a monitoring occasion (e.g., 205, 305, 308, 405) to be skipped.

Figure 12:
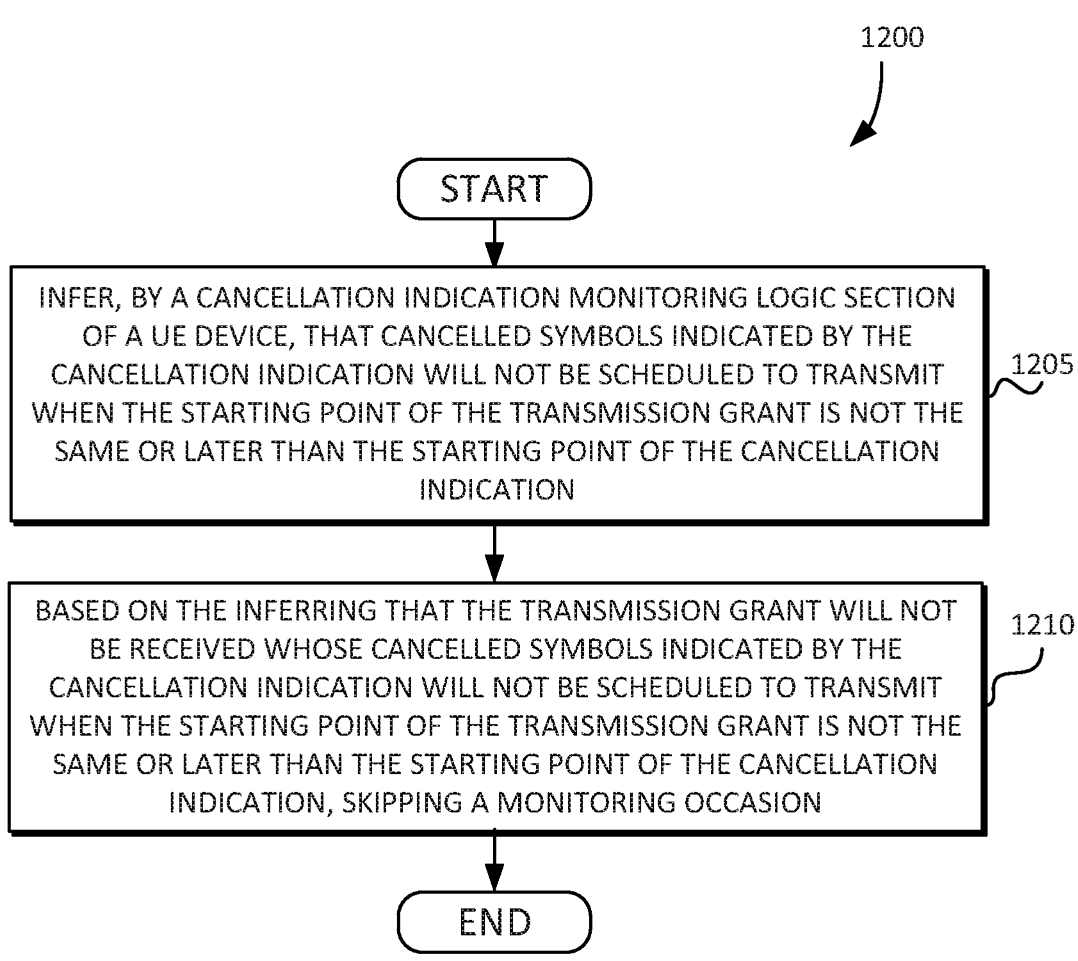
FIG. 12 is a flow diagram illustrating still another technique for skipping a monitoring occasion in accordance with some embodiments disclosed herein.

FIG. 12 is a flow diagram 1200 illustrating still another technique for skipping a monitoring occasion (e.g., 205, 305, 308, 405) in accordance with some embodiments disclosed herein. At 1205, a cancellation indication monitoring logic section (e.g., 110*a*, 110*b*, 110*c*) of a UE device (e.g., 105*a*, 105*b*, 105*c*) may infer that cancelled symbols indicated by the cancellation indication (e.g., 220, 320, 328, 420) will not be scheduled to transmit when the starting point of the transmission grant (e.g., 245, 422, 428) is not the same or later than the starting point of the cancellation indication (e.g., 220, 320, 328, 420). At 1210, based on the inferring that the transmission grant (e.g., 245, 422, 428) will not be received whose cancelled symbols indicated by the cancellation indication (e.g., 220, 320, 328, 420) will not be scheduled to transmit when the starting point of the transmission grant (e.g., 245, 422, 428) is not the same or later than the starting point of the cancellation indication (e.g., 220, 320, 328, 420), the cancellation indication monitoring logic section of the UE device may cause a monitoring occasion (e.g., 205, 305, 308, 405) to be skipped.

Figure 13:
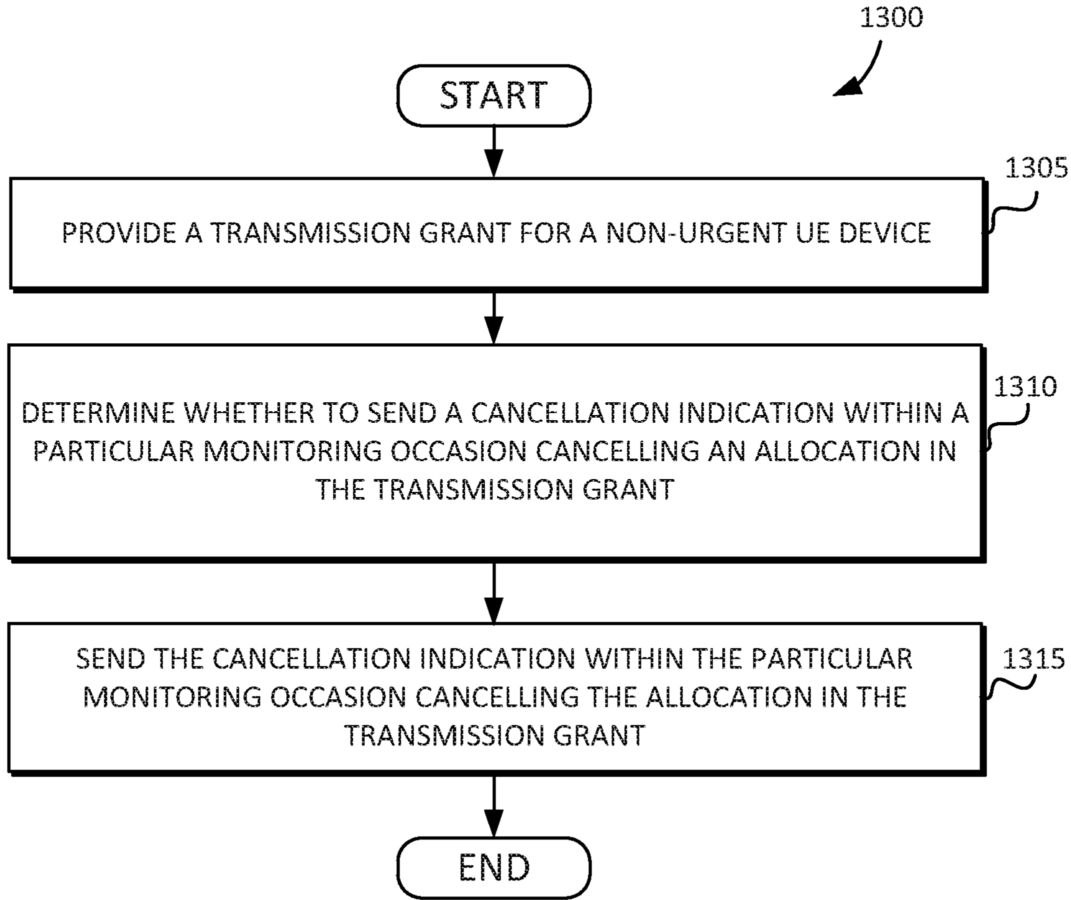
FIG. 13 is a flow diagram illustrating a technique for determining whether or not to send a cancellation indication in accordance with some embodiments disclosed herein.

FIG. 13 is a flow diagram 1300 illustrating a technique for determining whether or not to send a cancellation indication (e.g., 220, 320, 328, 420) in accordance with some embodiments disclosed herein. At 1305, the network can provide a transmission grant (e.g., 245, 422, 428) for a non-urgent UE device (e.g., 105*a*, 105*b*, 105*c*). At 1310, the network can determine whether to send the cancellation indication (e.g., 220, 320, 328, 420) within a particular monitoring occasion (e.g., 205, 305, 308, 405) cancelling an allocation in the transmission grant (e.g., 245, 422, 428). At 1315, the network can send the cancellation indication (e.g., 220, 320, 328, 420) within the particular monitoring occasion (e.g., 205, 305, 308, 405) cancelling the allocation in the transmission grant (e.g., 245, 422, 428). In some embodiments, the cancellation window (e.g., 210, 310, 410) is a potential region, and nothing is cancelled within the cancellation window unless the cancellation indication (e.g., 220, 320, 328, 420) indicating the cancellation is provided.

It will be understood that any of the components or any combination of the components described herein can be used to perform one or more of the operations of the flow diagrams of FIGS. 5 through 13. Further, the operations shown in the flow diagrams are example operations, and may involve various additional steps not explicitly covered. The temporal order of the operations may be varied.

Reference is now made to FIGS. 1 through 13. A system disclosed herein may include a UE device (e.g., 105*a*, 105*b*, 105*c*). The system may include a remote server (e.g., 115) to provide a transmission grant (e.g., 245, 422, 428) for a transmission (e.g., 235, 435) within a particular time (e.g., 210, 310, 410). The remote server (e.g., 115) can verify that there is no cancellation indication (e.g., 220, 320, 328, 420) that overlaps the particular time (e.g., 210, 310, 410). The remote server (e.g., 115) can provide, based on a verification that there is no cancellation indication (e.g., 220, 320, 328, 420) that overlaps, the transmission grant (e.g., 245, 422, 428) to the UE device (e.g., 105*a*, 105*b*, 105*c*). The particular time can be a cancellation window (e.g., 210, 310, 410).

The remote server (e.g., 115) can provide the transmission grant (e.g., 245, 422, 428) for the transmission (e.g., 435) at a time falling within the cancellation window (e.g., 210, 310,

410). The remote server (e.g., 115) can determine a grant window (e.g., 470) in which the transmission grant (e.g., 245, 422, 428) for the transmission (e.g., 435) falling within the cancellation window (e.g., 210, 310, 410) can be provided to the UE device (e.g., 105*a*, 105*b*, 105*c*). In some embodiments, the remote server (e.g., 115) does not provide any transmission grant outside of the grant window. The remote server (e.g., 115) can verify that the transmission grant (e.g., 245, 422, 428) falls within the grant window (e.g., 470). The remote server (e.g., 115) can provide, based on a verification that the transmission grant (e.g., 245, 422, 428) falls within the grant window (e.g., 470), the transmission grant (e.g., 245, 422, 428) to the UE device (e.g., 105*a*, 105*b*, 105*c*).

The cancellation window (e.g., 210, 310, 410) is associated with a monitoring occasion (e.g., 205, 305, 308, 405) that is associated with the UE device (e.g., 105*a*, 105*b*, 105*c*). The cancellation window (e.g., 210, 310, 410) may include a starting point at a time $T_1$ following an ending point of the monitoring occasion (e.g., 205, 305, 308, 405), the time $T_1$ being based on a time needed by the UE device (e.g., 105*a*, 105*b*, 105*c*) to process a cancellation of the transmission grant (e.g., 245, 422, 428). In some embodiments, the grant window (e.g., 470) includes an ending point at a time $T_2$ before a starting point of the monitoring occasion (e.g., 205, 305, 308, 405), the time $T_2$ being based on a time needed by the UE device (e.g., 105*a*, 105*b*, 105*c*) for processing the transmission grant (e.g., 245, 422, 428). The remote server (e.g., 115) can receive an indication of the time $T_2$ from the UE device (e.g., 105*a*, 105*b*, 105*c*).

The remote server (e.g., 115) can verify that there is a cancellation indication (e.g., 220, 320, 328, 420) that overlaps the cancellation window (e.g., 210, 310, 410). The remote server (e.g., 115) can not provide, based on a verification that there is the cancellation indication that overlaps, a transmission grant for a transmission to the UE device (e.g., 105*a*, 105*b*, 105*c*).

A cancellation monitoring logic section (e.g., 110*a*, 110*b*, 110*c*) of a UE device (e.g., 105*a*, 105*b*, 105*c*) can determine whether there is no transmission that overlaps with a cancellation window (e.g., 210, 310, 410) associated with a monitoring occasion (e.g., 205, 305, 308, 405). Based on determining that there is no transmission that overlaps with the cancellation window, the cancellation monitoring logic section (e.g., 110*a*, 110*b*, 110*c*) of a UE device (e.g., 105*a*, 105*b*, 105*c*) can skip the monitoring occasion (e.g., 205, 305, 308, 405).

The cancellation monitoring logic section (e.g., 110*a*, 110*b*, 110*c*) can cause the UE device (e.g., 105*a*, 105*b*, 105*c*) to not expend any processing cycles of the UE device doing any monitoring for a cancellation indication during the monitoring occasion (e.g., 205, 305, 308, 405). The cancellation monitoring logic section (e.g., 110*a*, 110*b*, 110*c*) can infer that the transmission grant (e.g., 245, 422, 428) will not be received whose ending point is later than a time $T_2$ before a starting point of the monitoring occasion (e.g., 205, 305, 308, 405), the time $T_2$ being based on a time needed by the UE device for processing the transmission grant. Based on an inference that the transmission grant (e.g., 245, 422, 428) will not be received whose ending point is later than the time $T_2$ before the starting point of the monitoring occasion (e.g., 205, 305, 308, 405), cancellation monitoring logic section (e.g., 110*a*, 110*b*, 110*c*) can cause the monitoring occasion to be skipped.

The various operations of methods described above may be performed by any suitable means capable of performing the operations, such as various hardware and/or software component(s), circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format.

Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A method, comprising:

verifying that there is no cancellation indication indicating a cancellation that is within a cancellation time window; and providing, based on the verifying that there is no cancellation indication indicating the cancellation that is within the cancellation time window, a transmission grant by a network to a user equipment (UE) device.

2. The method of claim 1, wherein the transmission grant is a first transmission grant, and the cancellation time window is a first cancellation time window, the method further comprising:

verifying that there is a cancellation indication indicating a cancellation that is within a second cancellation time window; and withholding, based on the verifying that there is the cancellation indication indicating the cancellation that is within the second cancellation time window, a second transmission grant to the UE device.

3. The method of claim 1, further comprising:

determining a grant window in which the transmission grant for the transmission falling within the cancellation time window can be provided to the UE device;

verifying that the transmission grant falls within the grant window; and providing, based on the verifying that the transmission grant falls within the grant window, the transmission grant to the UE device.

4. The method of claim 3, wherein the network does not provide any transmission grant outside of the grant window.

5. The method of claim 1, wherein:

the cancellation time window includes a starting point at a time T1 following an ending point of a monitoring occasion, the time T1 being based on a time needed by the UE device to process a cancellation of the transmission grant; and the grant window includes an ending point at a time T2 before a starting point of the monitoring occasion, the time T2 being based on a time needed by the UE device for processing the transmission grant.

6. The method of claim 5, further comprising receiving, by the network, an indication of the time T2 from the UE device.

7. The method of claim 1, wherein:

an ending point of the cancellation time window is based on a period "P" of a monitoring occasion; and a length of the cancellation time window is equal to the period "P" of the monitoring occasion.

8. The method of claim 1, wherein the transmission grant is a first transmission grant, method further comprising:

inferring no receipt of a second transmission grant that is a PDCCH carrying UL grant including an ending symbol no earlier than a first symbol of a physical downlink control channel (PDCCH) carrying downlink control information (DCI) with the cancellation indication, wherein the inferring is based on whether a corresponding transmission is in resource colliding with ones indicated by the DCI with the cancellation indication.

9. The method of claim 1, wherein the transmission grant is a first transmission grant and the verifying that there is no cancellation indication comprises verifying that there is no cancellation indication for the first transmission grant, the method further comprising:

verifying that there is a cancellation indication indicating a cancellation for a second transmission grant that is within the cancellation time window; and withholding, based on the verifying that there is the cancellation indication indicating the cancellation that is within the cancellation time window, the second transmission grant to the UE device.

10. The method of claim 1, wherein the transmission grant is a first transmission grant, and the cancellation time window is a first cancellation time window, the method further comprising:

determining a grant window in which the transmission grant for the transmission falling within the cancellation time window can be provided to the UE device;

verifying that the transmission grant falls within the grant window;

providing, based on the verifying that the transmission grant falls within the grant window, the transmission grant to the UE device;

verifying that there is a cancellation indication indicating a cancellation that is within a second cancellation time window; and withholding, based on the verifying that there is the cancellation indication indicating the cancellation that is within the second cancellation time window, a second transmission grant to the UE device.

11. The method of claim 1, wherein the transmission grant is a first transmission grant, and the cancellation time window is a first cancellation time window, the method further comprising:

verifying that there is a cancellation indication indicating a cancellation that is within a second cancellation time window;

withholding, based on the verifying that there is the cancellation indication indicating the cancellation that is within the second cancellation time window, a second transmission grant to the UE device, wherein:

the cancellation time window includes a starting point at a time T1 following an ending point of a monitoring occasion, the time T1 being based on a time needed by the UE device to process a cancellation of the transmission grant; and the grant window includes an ending point at a time T2 before a starting point of the monitoring occasion, the time T2 being based on a time needed by the UE device for processing the transmission grant.

12. The method of claim 1, further comprising:

determining a grant window in which the transmission grant for the transmission falling within the cancellation time window can be provided to the UE device;

verifying that the transmission grant falls within the grant window;

providing, based on the verifying that the transmission grant falls within the grant window, the transmission grant to the UE device; and inferring no receipt of a second transmission grant that is a PDCCH carrying UL grant including an ending symbol no earlier than a first symbol of a physical downlink control channel (PDCCH) carrying downlink control information (DCI) with the cancellation indication, wherein the inferring is based on whether a corresponding transmission is in resource colliding with ones indicated by the DCI with the cancellation indication.

13. A method, comprising:

identifying a cancellation indication by downlink control information (DCI), wherein a first symbol of a physical downlink control channel (PDCCH) providing the DCI with the cancellation indication is later than a last symbol of the PDCCH providing the DCI scheduling a physical uplink transmission; and based on the first symbol of the PDCCH providing the DCI with the cancellation indication being later than the last symbol of the PDCCH providing the DCI scheduling the physical uplink transmission, cancelling the physical uplink transmission.

14. The method of claim 13, further comprising, temporarily stopping monitoring for potential one or more PDCCH transmissions.

15. The method of claim 13, further comprising:

determining, by a cancellation indication monitoring logic section of a user equipment (UE) device, that there is no transmission that is within a cancellation window; and based on the determining that there is no transmission that is within the cancellation window, skipping a monitoring occasion, wherein skipping includes not expending any processing cycles of the UE device doing any monitoring for the cancellation indication during the monitoring occasion.

16. The method of claim 13, further comprising:

ensuring, by a network, that an ending point of a transmission grant is at least a time T2 before a starting point of a monitoring occasion, the time T2 being based on a time needed by a user equipment (UE) device for processing the transmission grant;

determining, by a cancellation indication monitoring logic section of the UE device, that the transmission grant will not be received whose ending point is later than the time T2 before the starting point of the monitoring occasion; and based on the determining that the transmission grant will not be received whose ending point is later than the time T2 before the starting point of the monitoring occasion, skipping the monitoring occasion.

17. A system, comprising:

a user equipment (UE) device; and a server configured to provide a transmission grant for a transmission within a cancellation time window, wherein the server is further configured to:

verify that there is no cancellation indication indicating a cancellation that is within the cancellation time window; and provide, based on a verification that there is no cancellation indication indicating the cancellation that is within the cancellation time window, the transmission grant to the UE device.

18. The system of claim 17, wherein the server is further configured to:

verify that there is a cancellation indication indicating a cancellation that is within the cancellation time window; and withhold, based on a verification that there is the cancellation indication indicating the cancellation that is within the cancellation time window, the transmission grant to the UE device.

19. The system of claim 17, wherein the server is further configured to:

determine a grant window in which the transmission grant for the transmission falling within the cancellation time window can be provided to the UE device, wherein the server does not provide any transmission grant outside of the grant window;

verify that the transmission grant falls within the grant window; and provide, based on a verification that the transmission grant falls within the grant window, the transmission grant to the UE device, wherein:

the cancellation window includes a starting point at a time T1 following an ending point of a monitoring occasion, the time T1 being based on a time needed by the UE device to process a cancellation of the transmission grant; and the grant window includes an ending point at a time T2 before a starting point of the monitoring occasion, the time T2 being based on a time needed by the UE device for processing the transmission grant.

20. The system of claim 17, wherein the cancellation time window is a first cancellation time window, and wherein the server is further configured to:

verify that there is a cancellation indication indicating a cancellation that is within a second cancellation time window; and withhold, based on a verification that there is the cancellation indication indicating the cancellation that is within the second cancellation time window, the transmission grant to the UE device.

* * * * *